Inventor
Lucien Péras
By Stevens, Davis, Miller + Mosher
Attorneys

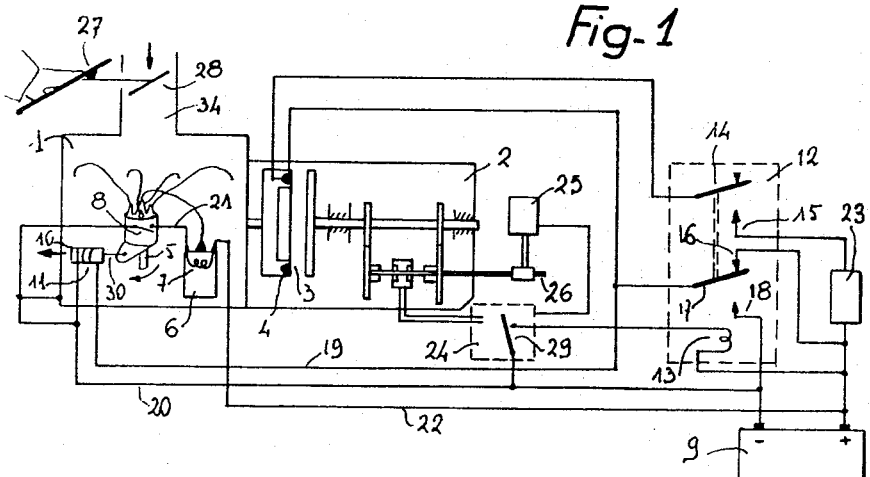

United States Patent Office 3,327,553
Patented June 27, 1967

3,327,553
METHOD AND DEVICE FOR DECELERATING THE ENGINE OF AN AUTOMOBILE VEHICLE EQUIPPED WITH AN AUTOMATIC CHANGE-SPEED TRANSMISSION BY VARYING THE IGNITION ADVANCE
Lucien Péras, Billancourt, France, assignor to Regie Nationale des Usines Renault, Billancourt, France
Filed Mar. 6, 1964, Ser. No. 349,940
Claims priority, application France, Mar. 7, 1963, 927,198, Patent 1,377,282
8 Claims. (Cl. 74—472)

Automatic change-speed transmissions for internal-combustion engined vehicles wherein a servo unit causes the meshing engagement of gears of a conventional gearbox are frequently equipped with means adapted automatically to vary the engine speed during gear changes. More particularly, when changing down to a lower gear in conjunction with the disconnection of the clutch, it is necessary to reduce considerably the engine power output or torque on the one hand to prevent the engine from racing during the uncoupling period and on the other hand to adapt the engine speed to the new gear ratio thus engaged.

As a rule these means control the delivery of the fuel-air mixture to the engine either by means of the main throttle or by means of an auxiliary butterfly throttle disposed in series with the main throttle.

Although basically and theoretically simple, this method may prove delicate to carry out in practice. The double control system necessary controlling the main throttle both by means of the driver's foot and automatically leads to complicated linkages frequently subject to misalignment and which are difficult to adjust, and the presence of an auxiliary butterfly throttle makes it necessary to increase the length of the induction pipe and is likely to cause the jamming of its pivot pin due to the carbonisation of the gums contained in low-grade petrol.

It is the essential object of the present invention to produce a variation and notably a reduction in the engine speed by varying the ignition advance during gear changes, this variation being controlled from the gear change mechanism.

If used alone, the method of this invention permits of avoiding the inconveniences set forth hereinabove, and if this method is used under less economical and more improved conditions in combination with the closing of the induction passage it permits of producing relatively rapid decelerations. Thus, the additional advantage of reducing free hydrocarbons in the exhaust gas, as particularly desirable nowadays, is obtained.

The ignition advance variation may be obtained by producing an angular shifting of the ignition control means, by substituting or adding an auxiliary ignition control system, or by using a time-delay device. This last solution is advantageous in that it provides without resorting to additional devices a satisfactory operation under idling conditions. The engine speed in the disengaged clutch position may be adjusted by introducing the desired retard notably for establishing a discrepancy between *up* gear changes and *down* gear changes by using means responsive to the automatic servo control system.

This invention will now be described in connection with typical forms of embodiment thereof which are illustrated diagrammatically by way of example in the accompanying drawings, in which:

FIGURE 1 is a diagram illustrating the basic principle and the relative arrangement of the component elements of an assembly comprising a power unit and an automatic change-speed mechanism, wherein an electromagnet is adapted when energized to shift the distributor head in the direction to introduce an ignition retard during gear changes. The clutch is of the electromagnetic type and the gearbox has parallel shafts;

FIGURE 2 is a modified embodiment of the arrangement illustrated in FIGURE 1 wherein the decelerator electromagnet controls simultaneously the distributor head and an auxiliary butterfly throttle mounted in the induction pipe or manifold and adapted to close the air-fuel mixture passage;

FIGURE 3 illustrates diagrammatically an advance varying system utilising an auxiliary contact breaker set in a fixed angular position, i.e. not subjected to the normal advance and substituted for the main contact breaker of the distributor when gear changes take place;

Figure 5:
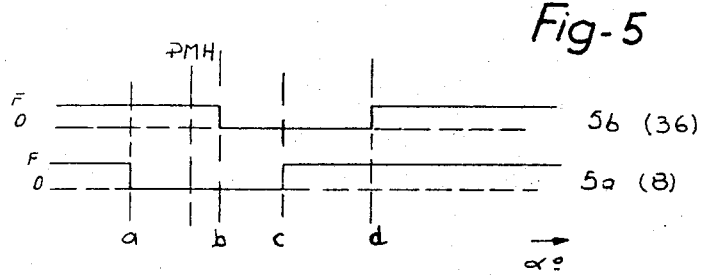
FIGURE 5 illustrates the angular operation of the distributor contacts in the arrangement shown in FIGURE 4.

In the basic arrangement illustrated in FIGURE 1 the engine shown diagrammatically at 1 is associated with a parallel-shaft change-speed mechanism or gearbox 2 as well as with an electromagnetic clutch 3 provided with an energising coil 4. The distributor 5 of the engine ignition system is connected as usual to the ignition coil 6 having its primary 7 connected to the contact breaker 8 through wire 21 and to the storage battery 9 of the vehicle through another wire 22. The distributor 5 is connected through mechanical means such as a rod 30 to the core 10 of an electromagnet of which the coil 11 is controlled from a relay 12 also controlling the clutch coil 4. This relay 12 comprises an energising coil 13 adapted to attract a pair of insulated contact blades 14, 17, the first blade 14 having only one front contact 15 and the other blade 17 having a back contact 16 and a front contact 18.

The blade 14 is connected to one end of coil 4 of said electromagnetic clutch of which the other end is connected to the blade 17, as shown.

The coil 11 of the electromagnet is also connected to the blade 17 through a connecting wire 19, the return from the coil 11 to the negative terminal of the storage battery 9 being through another connecting wire 20 also earthed for example to the frame of the vehicle, the contact breaker 8 being similar earthed. The front contact 15 leads to the positive terminal of battery 9 through a modulator 23 of known type, notably a transistorized type and the back contact 16 has return line leading directly to said terminal, the front contact 18 being on the other hand connected to the negative terminal of storage battery 9.

The coil 13 is connected on one side to the positive terminal of the battery and on the other side to the line 20, i.e., to the negative terminal of the battery through a contact 29 responsive to the servo mechanism 24 controlling the operation of the sliding forks of the change-speed mechanism 2. This servo-mechanism is controlled in turn by a governor 25 of a type adapted to produce the gear changes notably as a function of the velocity of rotation of the output shaft 26 of the change-speed mechanism.

The accelerator pedal 27 is adapted to control the position of the throttle 28 pivotally mounted in the induction pipe or manifold 34 but without any relationship with the core 10 of the angular retarding electromagnet.

The operation during a gear shift starts with an order from governor 25 which causes the operation of the servo-mechanism opening the contact 29 so as to de-energise the coil 13 and render the relay 12 inoperative. Thus, coil 4 is no more energised through contacts 14, 15 and 17, 18. On the other hand, coil 11 is energised through contacts 16, 17 and line 19, the return circuit being through line 20. As the core is attracted it moves the complete distributor assembly in the direction of the arrow, the stator movement being in the same direction as the normal direction of rotation of the rotor. Under these conditions the ignition is retarded and the engine decelerated. (In a practical actuation of the present invention, utilising a four-cylindered, four-stroke, 2,000 cc. engine, very satisfactory results have been obtained with a 30-degree ignition retard measured on the crankshaft with respect to the top dead centre, the engine speed dropping from 4,000 to 3,000 r.p.m. within 0.75 second, with the throttle half-open; of course, these values are given by way of illustration only and should not be construed as limiting the invention.)

The electromagnet may be replaced by a fluid-filled bellows or a suction-chamber responsive to solenoid-operated valve.

In FIGURE 2, the displacement of rod 30 controlling the distributor shift is conjugated with the closing movement of an auxiliary butterfly throttle 33 mounted in series with the main throttle valve 28 actuated by means of the accelerator pedal. This joint operation is obtained by means of an arm 31 and an adequate linkage 32. Thus the energisation of coil 11 determines at the same time the closing of the gas throttle and the introduction of an ignition retard with a view to produce a rapid deceleration.

FIGURE 3 illustrates a typical example of an ignition advance variation system controlled by an auxiliary contact breaker substituted for the main contact breaker for producing the ignition spark.

This arrangement comprises as in the preceding case a storage battery 9 energising the primary 7 of the ignition coil 6 through a line 22, the return from said primary to the negative terminal of the battery being through another line 21 leading to the blade 38 of relay 12. This contact blade engages in its front position the contact 40 connected to the main contact breaker 8 through a line 47, and in its back position the contact 39 connected to the auxiliary contact breaker 36 through another line 41. This auxiliary contact breaker 36 is shifted angularly in relation to the main contact breaker 8, so that the former opens only after clearing the top dead center position. The return from contact breakers 8 and 36 to the negative terminal of the battery is through the line 20. The condenser 35 protecting the contact breakers is inserted between lines 20 and 21 of the ignition circuit.

The relay 12 is controlled in the same fashion as in FIGURE 1, in that coil 13 is de-energised when the servo-mechanism is operated, so that relay 12 remains inoperative.

FIGURE 4 is a very simplified and diagrammatic section showing a special distributor incorporating two contact breakers of which one is not responsive to the ignition timing device. The driving shaft 42 driven from the vehicle engine carries cam means 43 adapted to act upon the auxiliary contact breaker 36 connected to lines 20 and 41. In addition, shaft 42, according to the conventional arrangement, has in axial extension 44 adapted to position in the radial direction the cams 45 acting upon the main contact breaker 8 connected to lines 20 and 47. The angular positions of said cams 45 in relation to the shaft 42 and cams 43 are controlled by inertia weights 46 acting upon springs (not shown), according to the well-known centrifugal type of automatic advance mechanism.

Cams 43 are set angularly with a view to cause the auxiliary contact breaker 36 to open after clearing the top dead centre position. This retard depending on the engine and on the desired minimum speed may be for example of the order of 20 to 60 degrees measured on the crankshaft.

Now the operation of this arrangement will be described with reference to FIGURE 5 illustrating the movements of contacts 8 along path 5a and of contacts 36 along path 5b as a function of the crankshaft angle with respect to the top dead center of one of the cylinders.

At the angular position a before the top dead centre, corresponding to the optimum ignition advance, contact breaker 8 opens, causing the spark to flash across the secondary of coil 6, and the ignition of the air-fuel mixture, this sequence of operations taking place outside the gear change periods. On the other hand, during gear changes the relay 12 is de-energized and contact 36 substituted for contact breaker 8 due to the operation of switches 38, 39 and 40.

The opening of contact 36 will be limited by construction only to angle b after the top dead centre. The building up of the ignition spark in the secondary of coil 6 as a consequence of the breaking of the primary energisation will henceforth occur only at this angular position b, thus reducing the engine power output or torque and producing the desired deceleration. Contacts 8 and 36 close at c and d respectively.

Figure 8:
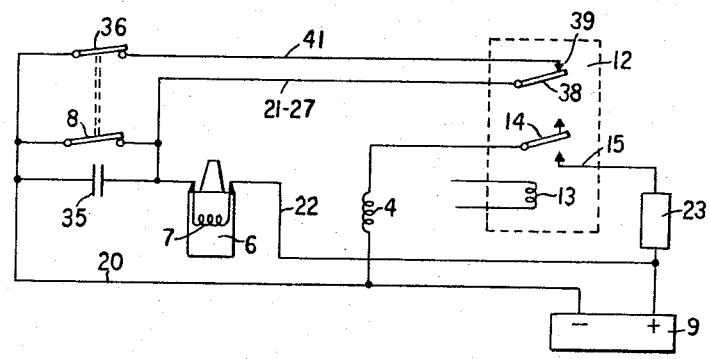
FIGURE 8 illustrates a variation of the advance varying system illustrated in FIGURE 3.

In certain cases where the ignition advance remains moderate and the number of cylinders is reduced, it is possible, instead of substituting contact breaker 38 for contact breaker 8, to connect these two contact breakers in parallel, lines 21 and 47 being merged into one and contact 40 eliminated as shown in FIGURE 8. This is possible only if the opening at b of the auxiliary contact breaker 36 after the top dead centre precedes the closing at c of the main contact breaker 8, otherwise the ignition would be suppressed. (FIGURES 4 and 5.)

Figure 6:
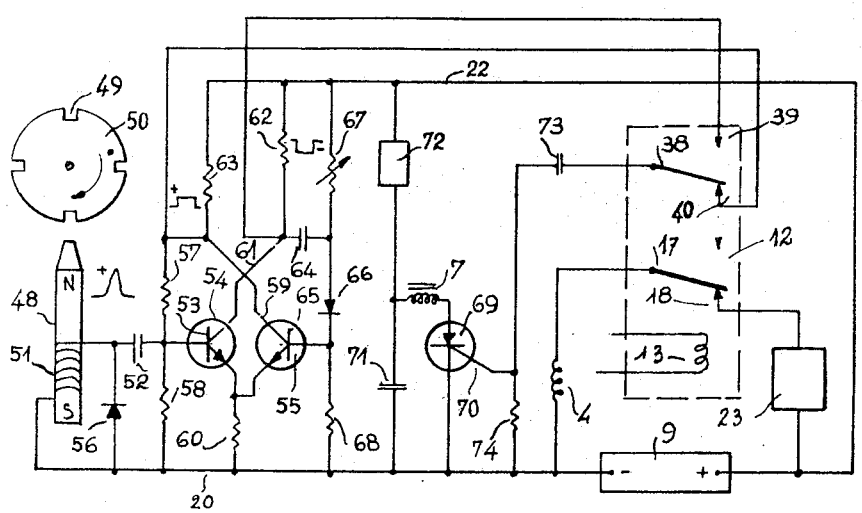
FIGURE 6 is a diagrammatic illustration of the basic principle of the device of this invention with ignition advance applied to an electronic ignition system.

FIGURE 6 illustrates diagrammatically the principle of a device according to this invention as applied to an electronic ignition system, the ignition retard being obtained during the gear change periods by inserting a retard which is fixed in time into the ignition control, so that the higher the engine speed the better the efficiency of this ignition retard.

The device shown in FIGURE 6 is given by way of example. In this example the clutch coil 4 is energised as in the case of FIGURE 3 through relay 12 and modulator 23 from the storage battery 9.

The ignition timing is governed by means of a magnetic core 48 associated with a slotted disc 50 of which the slots 49 move past said core 48 in synchronism with the engine rotation, this disc being responsive to the conventional centrifugal or electric advance means. The core 48 is surrounded by a coil 51 connected at one end to the return line 20 leading to the negative terminal of the battery 9 and at the other end through a condenser 52 to the base 53 of a NPN-type transistor 54 constituting with a NPN-type transistor 55 a monostable multivibrator of a type already known per se.

A diode 56 is connected across the terminals of coil 51 and short-circuits the negative alternations which would be applied to the base 53. This base electrode 53 is biased by a bridge comprising two resistances 57, 58 connected between the line 20 and the collector electrode 59 of transistor 55. The biasing is such that transistor 54 cannot be conducting when transistor 55 is conducting.

The emitter electrodes of transistors 54 and 55 are connected to each other and to line 20 through a coupling resistance 60.

The collector electrodes 61 and 59 of transistors 54 and 55 are each connected through a resistance 62 and 63 respectively the line 22 leading to the positive terminal of battery 9. A condenser 64 is connected between collector 61 to the base 65 of transistor 55 through a diode 66 which is conducting in the direction from collector 61 to base 65. A resistance 67 connected between the junction point of condenser 64 and diode 65 on the one hand and connecting line 22 on the other hand constitutes with this condenser 64 the time constant of the circuit. A leak 68 is provided between the base 65 and line 20.

A solid thyratron 69 of which the control electrode is designated by the reference numeral 70 is connected in series with the primary 7 of the ignition coil and a tank condenser 71, the condenser 71 and the thyratron having a common point on line 20. A known device 72 consisting for example of a simpler resistance or a converted charges the condenser 71 from the line 22 leading from the positive terminal of the battery 9.

The control electrode 70 of thyratron 69 is connected through a deriving condenser 73 to the contact blade 38 of relay 12, this blade engaging the fixed contact 39 in the de-energised condition of this relay and the other fixed contact 40 in the energised condition. A leak 74 is disposed between the electrode 70 and the connecting line 20.

The back contact 39 is connected to the collector electrode 61 of transistor 54 attached by the magnetic pick-up device 48, and the front contact 40 is connected to the collector electrode 59 of the second transistor 55. The thyratron 69 is thus controlled by one or the other transistor according as a gear change is underway or not.

The operation of this assembly will now be briefly described with reference to FIGURE 7, considering that the time-constant monostable multivibrator and the solid-thyratron ignition system are known separately and that only their combination with the gear change device for retarding the ignition in order to decelerate the engine is an integral part of this invention.

The coil 51, at the desired and proper time for the ignition under normal driving conditions, becomes the seat of a positive voltage rise, as shown by the curve $7a$, at an angle $g$ before the top dead centre.

This voltage renders the transistor 54 conducting so that its collector voltage drops as shown by the curve $7b$, thereby transmitting through condenser 64 a pulse blocking the transistor 55 of which the collector voltage rises as shown in curve $7c$. When relay 12 is energised, outside the gear-change periods, contact 38–40 is closed and the voltage variation in collector 59 which is derived by condenser 73 and resistance 74 renders the thyratron 69 conducting and causes the ignition to take place as shown by the curve $7d$ and simultaneously the discharge of condenser 71.

On the contrary, when a gear change takes place with relay 12 de-energised the signal applied to the electrode 70 is received by the collector 61 of the first transistor 54. After the derivation it is the return side of transistor 54 in its non-conducting condition that will cause the ignition at point $h$ after the top dead centre, as shown by the line $7e$, the time lag between point $g$ and point $h$ being subordinate to the time constant of the condenser and resistance unit 64, 67, since the two transistors are coupled.

Assuming that the engine revolves at 100 revolutions per second at the time when for changing speed relay 12 is switched from its inoperative to its operative condition, the introduction of a 2-millisecond lag will shift the ignition point by 72 degrees, measured on the crankshaft and on the other hand when idling at 10 revolutions per second the resulting angular shift reduced to one-tenth, i.e. 7.2 degrees, will be acceptable without any risk of stalling the engine when engaging the lowest forward speed or the reverse with the vehicle at a standstill, without requiring a special mechanism for suppressing this retard when the vehicle is motionless.

Of course, by analogy with the diagram of FIGURE 3, the retard device may be dispensed with by arranging another magnetic pick-up device shifted angularly in relation to the first one; in this case, relay 12 will connect one or the other pick-up device according as a gear change takes place or not, with exactly the same result as in the case of FIGURE 3, i.e. either an angular shift or a constant shift according as the second pick-up device is responsive or not to the ignition advance system.

Finally, by analogy, with U.S. patent application field on Oct. 23, 1963, No. 318,367, now abandoned, the ignition advance variation may be rendered progressive as a function of time and notably in the case illustrated in FIGURES 1 and 2 by means of a damping device such as an air dash-pot comprising a cylinder 80 supported by a platform 84. The cylinder having an orifice 81, and a piston 82 connected to the core 10 of the electromagnet by a shaft 83, the electromagnet controlling the angular shift of the distributor.

Figure 7:
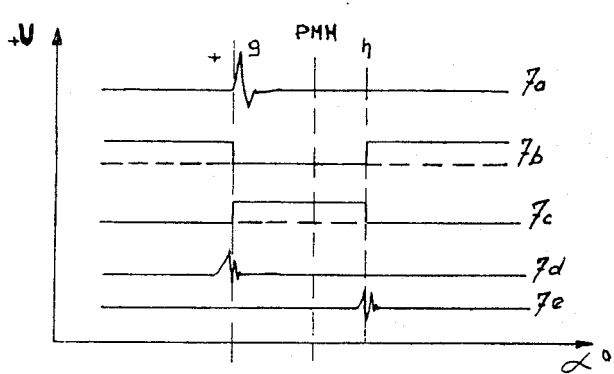
FIGURE 7 is a diagram showing the voltage variations produced at different points of the arrangement of FIGURE 6 as a function of the crankshaft angle, i.e. of time, at constant speed.
Figure 9:
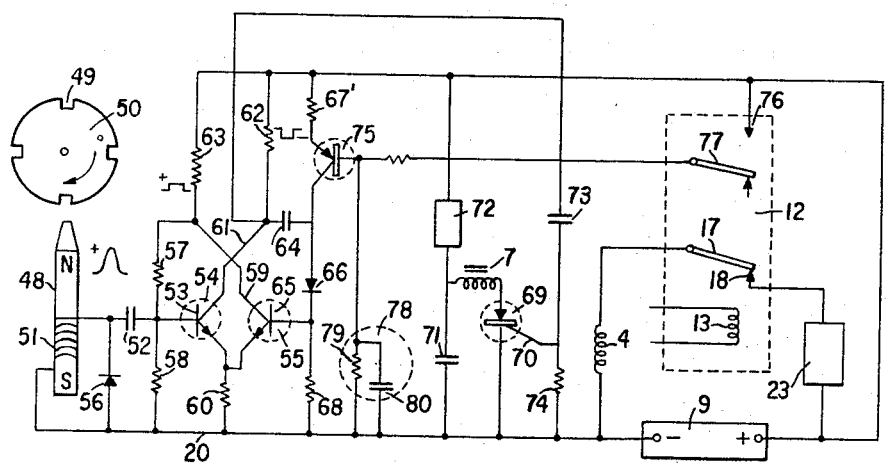
FIGURE 9 illustrates a variation of the electronic ignition advance system illustrated in FIGURE 6.

FIGURE 9 illustrates a variation of the circuit shown in FIGURE 6 in which resistor 67 is replaced by a transistor 75 and a resistor 67' having a low ohmic value, the base electrode of the transistor 75 being connected to a circuit 78 having a large time constant, and the resistor 79 and condenser 80 being charged or discharged through the contact 76–77 of relay 12 which replaces the contact 38–40 of FIGURE 7, making it possible to apply or remove progressively the ignition retard, this progressiveness having for example a duration of the order of 0.05 to 0.5 second. Of course, these values should not be construed as limiting this invention.

Under certain limiting conditions the device could be arranged with a view to avoid the sudden switching of electrode 70 to one or the other transistor; in this case, the electrode 70 is connected permanently through condenser 73 to the collector 61 of transistor 54, the only variable being in this case the gate width.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. In an internal combustion engine having a crankshaft, an ignition system including a distributor carrying a first ignition-releasing contact-breaker means forming a portion of a first circuit, and equipped with an automatic change-speed transmission having a servo unit which causes the meshing of gears, an automatic speed control device for varying the speed advance comprising, a second circuit including a second ignition-releasing contact-breaker means carried by said distributor, means for shifting said second ignition-releasing contact-breaker means angularly in relation to said first ignition-releasing contact-breaker means so that it opens only after a top center position of the crankshaft is reached, and relay means responsive to said servo unit for placing said first circuit including said first ignition-releasing contact-breaker means and said second circuit including said second ignition-releasing contact-breaker means in parallel relationship.

2. In an internal combustion engine having an ignition system including a distributor, a throttle, and equipped with an automatic change-speed transmission having a servo unit which causes the meshing of gears, an automatic speed control device for varying the speed by varying the ignition advance point, comprising a displacement device mechanically connected to the distributor of the ignition system and relay means responsive to said servo unit for energizing said displacement device to produce an angular shift of the distributor.

3. The structure as defined in claim 2 wherein said displacement device includes an electromagnet.

4. A structure as defined in claim 2 including a damping device connected to said displacement device so that angular movement of the distributor is rendered as a function of time.

5. A structure as defined in claim 2 wherein said displacement device is also mechanically connected to and actuates means controlling the throttle of said engine.

6. In an internal combustion engine having a crankshaft, an ignition system including a distributor carrying a first ignition releasing contact-breaker means, and equipped with an automatic change-speed transmission having a servo unit which causes the meshing of gears, an automatic speed control device for varying the speed by varying the ignition advance point comprising, a second ignition-releasing contact-breaker means carried by said distributor, said second ignition-releasing contact-breaker means being shifted angularly in relation to said first ignition-releasing contact-breaker means so that it will open only after a top center position of the crankshaft is reached, relay means responsive to said servo unit for substituting said second ignition-releasing contact-breaker means for said first ignition-releasing contact-breaker means.

7. In an internal combustion engine having a solid thyration ignition system and equipped with an automatic change-speed transmission having a servo unit which causes the meshing of gears, an automatic speed control device for varying the speed by varying the ignition advance point, comprising a time constant monostable multivibrator including a pair of transistors and having its input connected to a pick-up device operatively connected to said engine and controlling said solid thyration, and relay means responsive to said servo unit for switching the signal applied to said solid thyration from one transistor of said monostable multivibrator to the other transistor which emits a signal having a time lag dependant upon the time constant of the multivibrator.

8. A device as described in claim 7 wherein said speed control device is provided with damping means for progressively varying the ignition advance point in response to said servo unit, said damping means including a separate time constant circuit acting upon a transistor operable as a variable resistance in conjunction with said monostable multivibrator.

References Cited
UNITED STATES PATENTS

| | | | |
|---|---|---|---|
| 2,062,484 | 12/1936 | Timian | 192—.084 |
| 2,297,676 | 10/1942 | Elkin | 74—472.3 |
| 3,023,870 | 3/1962 | Udelman | 192—3 |

DONLEY J. STOCKING, *Primary Examiner.*

DAVID J. WILLIAMOWSKY, *Examiner.*

H. S. LAYTON, *Assistant Examiner.*